No. 761,234. PATENTED MAY 31, 1904.
J. S. KEMP.
GEARING FOR FERTILIZER DISTRIBUTERS.
APPLICATION FILED AUG. 5, 1903.
NO MODEL.
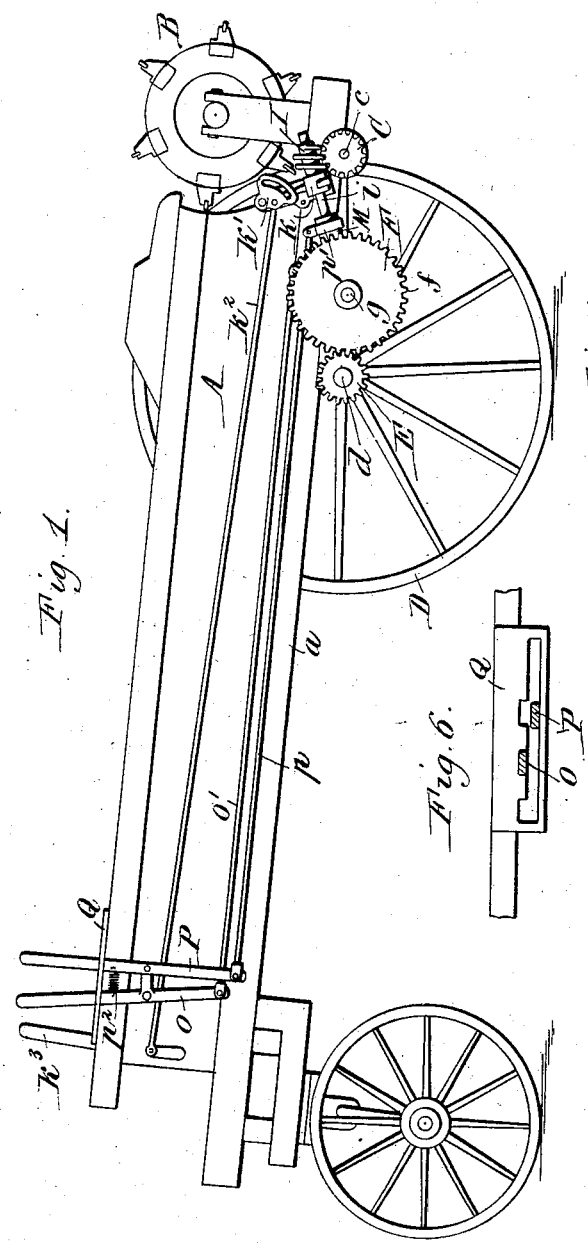
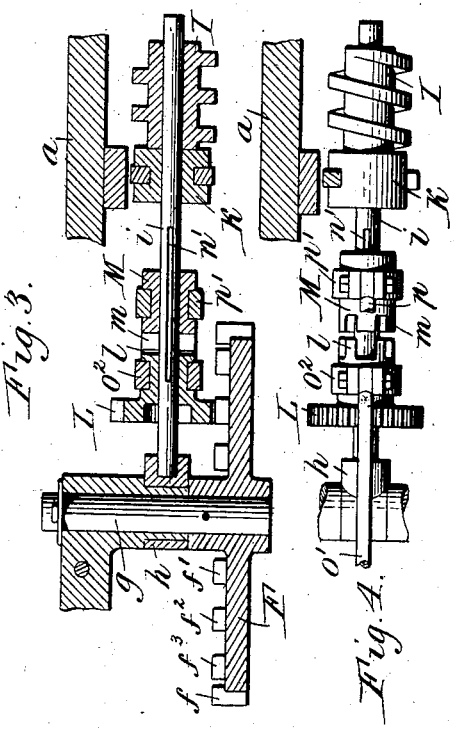
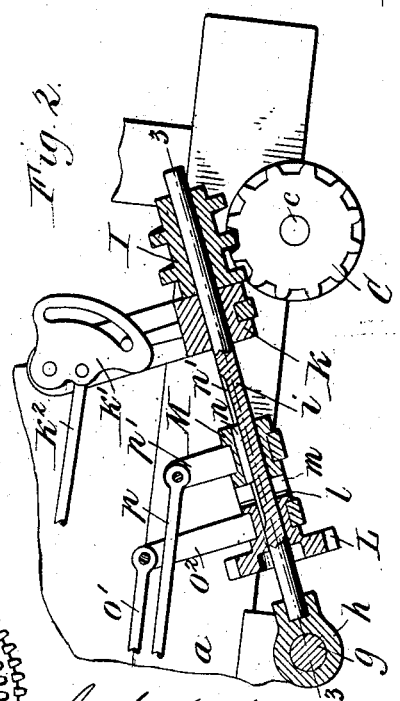
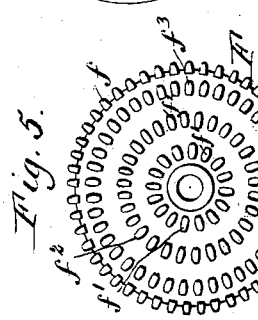
Witnesses:
E. A. Volk.
R. W. Runser.
Jos. S. Kemp, Inventor.
By Wilhelm Bonner
Attorneys.

No. 761,234.

Patented May 31, 1904.

UNITED STATES PATENT OFFICE.

JOSEPH SARGENT KEMP, OF NEWARK VALLEY, NEW YORK.

GEARING FOR FERTILIZER-DISTRIBUTERS.

SPECIFICATION forming part of Letters Patent No. 761,234, dated May 31, 1904.

Application filed August 5, 1903. Serial No. 168,312. (No model.)

*To all whom it may concern:*

Be it known that I, JOSEPH SARGENT KEMP, a citizen of the United States, and a resident of Newark Valley, in the county of Tioga and State of New York, have invented a new and useful Improvement in Gearing for Fertilizer-Distributers, of which the following is a specification.

This invention relates to that class of fertilizer-distributers or manure-spreaders which embody a box or body mounted on a wheeled frame for containing the fertilizer or manure, a beater at the rear end of the box or body, a movable apron or other feed device by which the material is fed against the beater, and a worm mechanism by which the apron of the feed device is driven from the rear axle. This worm mechanism usually contains a disk gear-wheel which has several concentric gear rims or faces of different diameters and a longitudinal worm-shaft on which a pinion is mounted which is driven from this wheel. For changing the speed of the apron and the rate at which the material is distributed by the beater it is necessary to shift the pinion on the worm-shaft so as to engage the pinion with a larger or smaller gear-face on the driving gear-wheel.

The object of this invention is to improve this feed mechanism by so constructing the same that the pinion can be uncoupled from the worm-shaft before the pinion is shifted on the shaft. This permits the pinion to revolve freely on the shaft during the operation of engaging the pinion with a different gear-face and prevents injury to the parts if the pinion should strike with its teeth against the ends of the teeth of the gear-face instead of entering with its teeth in the spaces between the teeth of the gear-face.

In the accompanying drawings, Figure 1 is a side elevation of a manure-spreader provided with my improvements. Fig. 2 is a longitudinal sectional elevation of the worm mechanism, on an enlarged scale. Fig. 3 is a horizontal section of the same in line 3 3, Fig. 2. Fig. 4 is a top plan view of the worm-shaft and the parts mounted thereon. Fig. 5 is a face elevation of the disk gear-wheel. Fig. 6 is a top plan view of the notched bar or segment in which the hand-levers are arranged.

Like letters of reference refer to like parts in the several figures.

A represents the body or box of a manure-spreader; $a$, the frame thereof; B, the beater; $c$, the transverse rear shaft by which the bottom or apron (not shown) is driven, and C the worm-wheel on said shaft.

$d$ represents the rear axle, and D one of the rear wheels. E represents the pinion which is secured to the rear axle for driving the feed mechanism.

F represents the disk wheel, which has a peripheral gear-rim $f$ meshing with the pinion E and is provided on its inner side with several concentric gear rims or faces $f'$ $f^2$ $f^3$ of different diameters. This disk wheel may turn on a horizontal stud $g$, which is secured to the frame $a$ of the machine and which carries on the inner side of the disk wheel a bearing $h$, or the disk wheel may be mounted in any other suitable manner.

$i$ represents the longitudinal worm-shaft, which is journaled at its front end in the bearing $h$ and carries at its rear end the worm I, which meshes with the worm-wheel C. The worm-shaft is journaled near its rear end in a bearing $k$, which can be raised or lowered by a segment $k'$, rod $k^2$, and hand-lever $k^3$ for throwing the worm out of or into gear. All of these parts may be of any ordinary or suitable construction.

L represents the pinion which is mounted on the worm-shaft and adapted to be engaged with one of the gear-faces $f'$ $f^2$ $f^3$ of the disk-wheel F. This pinion is mounted loosely on the worm-shaft so that it can be moved lengthwise on the same and is not directly coupled to the shaft for driving the same, but free to turn loosely thereon. This pinion is provided on its rear side with a clutch-face $l$, which is adapted to engage a corresponding clutch-face $m$ at the front end of a driving or coupling sleeve M. The latter is mounted on the worm-shaft so as to be capable of lengthwise movement thereon and is coupled to the worm-shaft by any suitable means so as to drive the shaft—for instance, by a key $n$, secured to the coupling-sleeve and projecting into a groove $n'$ in the shaft. The pinion is shifted on the worm-shaft by any suitable mechanism—for instance, by a hand-lever O at the front of the machine, which is connected by a rod O' with a collar O², embracing the pinion. The driving-sleeve M is shifted by a similar mechanism—for instance, a lever P, which is connected by a rod $p$ with a collar $p'$, embracing the sleeve. The pinion-lever O is held in its adjusted position by a notched bar or segment Q or other suitable means, and the sleeve-lever P is held away from the pinion-lever O by a spring $p^2$. The latter tends to move the sleeve forwardly and to hold it in engagement with the pinion.

When the pinion L meshes with one of the concentric gear-faces of the disk-wheel F, as shown in Figs. 2 and 3, it is held in position by the lever O and notched bar Q, the clutch-face of the driving-sleeve M is held in engagement with the clutch-face of the pinion by the spring, and the worm-shaft is rotated. When it is desired to change the position of the pinion for changing the rate of feed, the sleeve-lever P is pressed toward the pinion-lever O, whereby the driving or coupling sleeve is disengaged from the pinion, leaving the latter free to turn on the shaft, as represented in Fig. 4. The pinion-lever is now unlocked from the notched bar Q and moved on the shaft to the desired position. The sleeve-lever can take part in this movement, but holds the sleeve so far from the pinion that these parts remain uncoupled. In effecting this movement the pinion may strike with one or more of its teeth against the ends of the teeth of the gear-face with which the pinion is desired to be engaged. This is, however, unobjectionable, as there is no load on the pinion. As soon as the teeth of the pinion register with the spaces between the teeth on the gear-face the teeth of the pinion (one or more) enter between the teeth of the gear-face. This movement is performed without any particular strain on the parts, because there is no load on the pinion. When the latter has been so engaged with the appropriate gear-face, the pinion-lever O is locked on the notched bar Q and the lever P is released. The spring now moves the coupling-sleeve against the pinion, so as to engage their clutch-faces, whereby the pinion is coupled to the worm-shaft and the latter is now driven. By this means the pinion can be shifted and engaged with different gear-faces without danger of injuring the parts, although the position of the disk-wheel is not changed during this operation and without requiring much pressure to be exerted against the pinion by the operator.

I claim as my invention—

1. The combination of a wheel having gear-faces of different diameters, a shaft, a pinion mounted to turn loosely on said shaft and capable of longitudinal movement thereon for engagement with either of said gear-faces, a driving-sleeve capable of lengthwise movement on said shaft and connected therewith by a driving device, and means for coupling said pinion to said driving-sleeve, substantially as set forth.

2. The combination of a wheel having gear-faces of different diameters, a shaft, a pinion mounted to turn loosely on said shaft and capable of longitudinal movement thereon for engagement with either of said gear-faces, a driving-sleeve capable of lengthwise movement on said shaft and connected therewith by a driving device, means for coupling said pinion to said driving-sleeve, and devices for independently moving and locking said pinion and driving-sleeve, substantially as set forth.

3. The combination of a wheel having gear-faces of different diameters, a shaft, a pinion mounted to turn loosely on said shaft and capable of longitudinal movement thereon for engagement with either of said gear-faces, a driving-sleeve capable of lengthwise movement on said shaft and connected therewith by a driving device, said pinion and sleeve being provided at their adjacent ends with clutch-faces, substantially as set forth.

4. The combination of a driving gear-wheel having gear-faces of different diameters, a shaft provided at its rear end with a worm, a pinion mounted on the front portion of said shaft to turn loosely thereon and capable of longitudinal movement on said shaft for engagement with either of said gear-faces, a driving-sleeve arranged on said shaft in rear of said pinion, said sleeve being capable of longitudinal movement on said shaft and connected therewith by a driving device, means for coupling said pinion and sleeve and a worm-wheel and feed device driven by said worm, substantially as set forth.

5. The combination of a wheel having gear-faces of different diameters, a shaft, a pinion mounted to turn loosely on said shaft and capable of lengthwise movement thereon for engagement with either of said gear-faces, a driving-sleeve capable of longitudinal movement on said shaft and connected therewith by a driving device, means for coupling said pinion and sleeve, means for adjusting and holding said pinion independently of said sleeve, and a spring tending to hold said sleeve in engagement with said pinion, substantially as set forth.

6. The combination of a wheel having gear-faces of different diameters, a shaft, a pinion mounted to turn loosely on said shaft and capable of lengthwise movement thereon for engagement with either of said gear-faces, a driving-sleeve capable of longitudinal movement on said shaft and connected therewith by a driving device, means for coupling said pinion and sleeve, a shifting-lever connected with said pinion, means for locking said lever in position, a shifting-lever connected with said sleeve, and a spring tending to hold said sleeve in engagement with said pinion, substantially as set forth.

Witness my hand this 3d day of August, 1903.

JOSEPH SARGENT KEMP.

Witnesses:
W. B. ELWELL,
THOS. BRICK.